United States Patent [19]
Danon

[11] 3,927,810
[45] Dec. 23, 1975

[54] BICYCLE SUPPORT RACK
[75] Inventor: Michael Danon, New York, N.Y.
[73] Assignee: Leisure Moments Incorporated, New York, N.Y.
[22] Filed: Mar. 26, 1973
[21] Appl. No.: 344,734

[52] U.S. Cl. .......................... 224/29 R; 224/42.03 B
[51] Int. Cl.[2] ............................................ B60R 9/10
[58] Field of Search....... 224/42.03 B, 42.1 F, 29 R; 211/17, 18, 19, 20, 21, 22

[56] References Cited
UNITED STATES PATENTS

| | | | |
|---|---|---|---|
| 2,596,860 | 5/1952 | McCrory et al. | 224/42.1 E |
| 3,281,030 | 10/1966 | Gosswiller | 224/42.1 F |
| 3,874,575 | 4/1975 | Wasserman | 224/42.03 B |

OTHER PUBLICATIONS

American Products, Inc., 2200 W. Diversey, Chicago, Illinois, Lug-A-Bike Publication, Aug. 15, 1972.

Mark Fore Industries, Division of Beatrice Foods, Chelsea, Mass., Instruction Sheet for Model 112 Bicycle Carrier.

Primary Examiner—Robert J. Spar
Assistant Examiner—Jerold M. Forsberg
Attorney, Agent, or Firm—Ryder, McAulay, Fields, Fisher & Goldstein

[57] ABSTRACT

A bicycle support rack for attachment to selected body portions of a vehicle. The rack includes a pair of laterally spaced U-shaped side members and a pair of brace members extending transversely thereof. The brace members slidably engage the side members for movement to selected positions thereon; said positions dependent upon the selected body portion of the vehicle to which the support rack is to be attached. A bicycle carrier member projects outwardly from one of the brace members for supporting one or more bicycles thereon.

3 Claims, 5 Drawing Figures

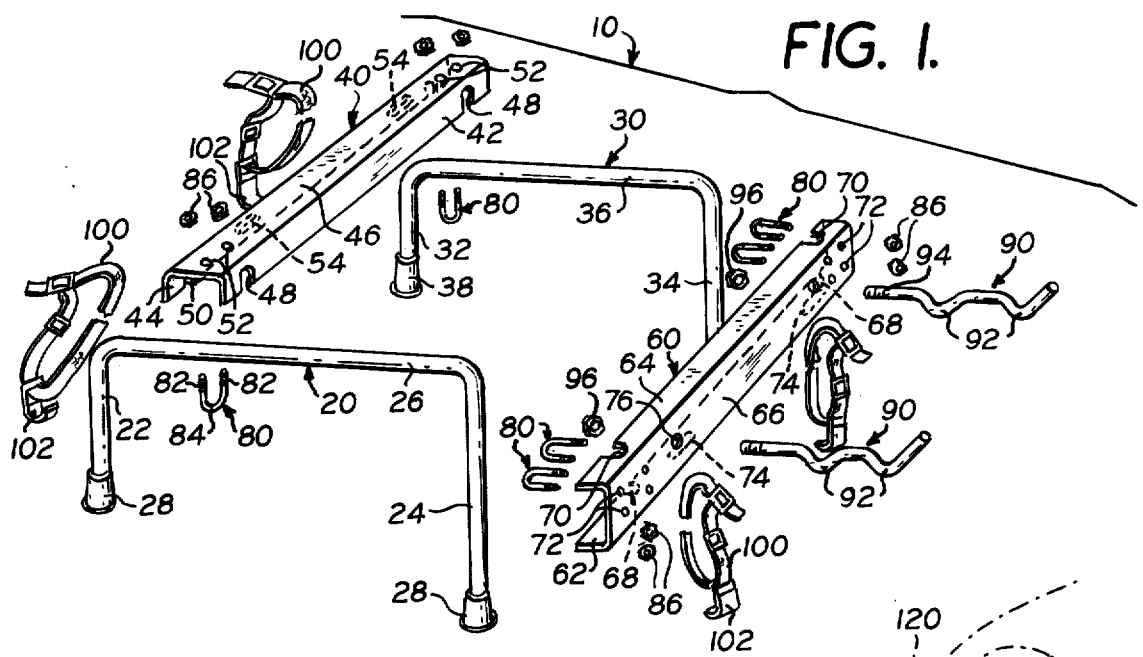
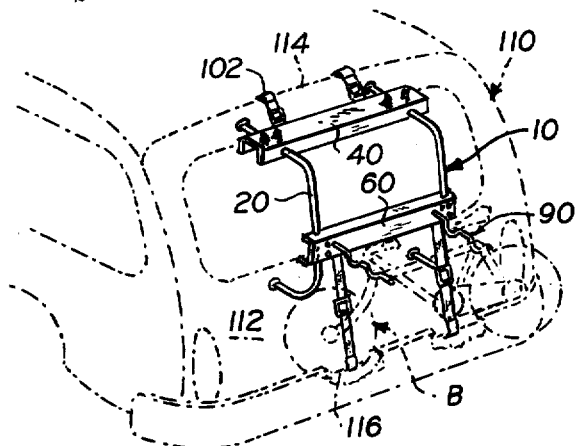
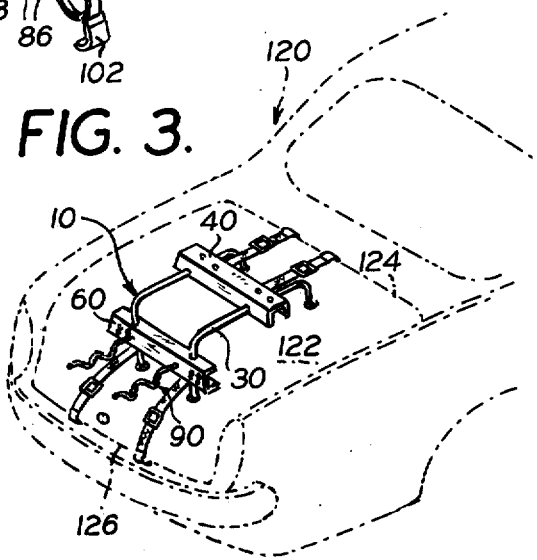
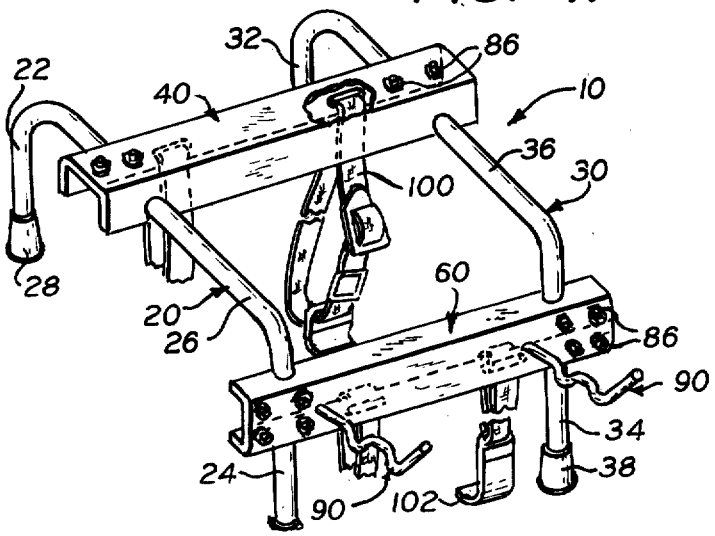

BICYCLE SUPPORT RACK

BACKGROUND OF THE INVENTION

1. Field of the Invention

This invention relates, generally, to automobile carriers, and more particularly, to a bicycle support rack for attachment to selected body portions of a vehicle.

2. Description of the Prior Art

Heretofore, bicycle carriers have been proposed for supporting bicycles on various body portions of an automobile. The need for such carriers or support racks arises from the limited interior or luggage space found in most vehicles; particularly in passenger sedan and station wagon automobiles of both American and foreign origin. The need is even more apparent when one considers the space limitations inherent in so-called "compact" model automobiles. Furthermore, even where the interior space is such as to accommodate the bicycle, the space taken up thereby can no longer be allocated for passenger or cargo use. In such instances, the interior space taken up by the bicycle is the space most often needed at a crucial time; such as on a family vacation. The use of such exterior carriers or support racks thus enables a person to transport his bicycle to whatever location desired by means of his automobile, without being confined to the interior space limitations thereof.

Prior attempts directed toward providing carriers or racks for supporting articles on various portions of an automobile are illustrated in U.S. Pat. Nos. 3,137,422; 3,204,839; 3,437,248 and 3,710,999, each of which patents embodies an invention that is deemed limited in its application of use. More specifically, U.S. Pat. No. 3,137,422 is directed to a bicycle carrier that is adapted to be mounted solely to the roof portion of an automobile; the inference being that the roof portion lies in a substantially horizontal or flat plane. U.S. Pat. No. 3,204,839 is directed to an automobile bicycle carrier adapted to be mounted on the lid of the trunk, which is also required to be a horizontal surface portion of the automobile body. U.S. Pat. No. 3,437,248 is directed to an automobile carrier designed for attachment to a single type of automobile; namely, those having a sloping rear deck. U.S. Pat. No. 3,710,999 is directed to an automobile carrier deemed the most versatile of the above noted prior art structures in that it may be mounted on various types of automobiles irrespective of the design, configuration or place of manufacture of the automobile. However, this carrier is deemed to be of a relatively complicated construction rendering the same cumbersome to mount on the automobile.

Other carriers or support racks known in the prior art are deemed to be either hazardous or inconvenient in their intended use or mounting procedure. Such deficiencies include structures which lack sufficient stability; interfere with the rear vision of the driver; involve cumbersome mounting to the automobile bumpers; and/or block access to the trunk of the automobile. The present invention is directed toward overcoming the various shortcomings noted in the prior art by providing bicycle support rack adapted to be easily mounted on various types of automobiles, at selected body portions thereof, irrespective of the configuration of the automobile supporting surface.

SUMMARY OF THE INVENTION

The bicycle support rack of the present invention includes a pair of laterally spaced U-shaped side members, each having leg portions of unequal length adapted to abut selected spaced body portions of an automobile, and an intermediate portion interconnecting the leg portions. A pair of brace members extends transversely of the side members, each having a channel shape cross section defining flange portions and an intermediate web portion. Located at opposite end portions of the brace members, in the respective flange portions thereof, are aligned open end slots for receiving the spaced side members and permitting the brace members to be slidably moved to selected positions on the said side members. The assembly procedure for the support rack provides for one of the brace members to be slidably mounted on the intermediate portions of the laterally spaced side members and the other one of the said brace members to be slidably mounted on one set of the laterally spaced leg portions of the said side members. The arrangement is such to provide a structure that is firmly mounted on a selected body portion of the automobile to achieve multi-axis support and thus a high degree of stability. Suitable fastening means are provided for securing the brace members to the selected positions on the side members and for mounting the assembled support rack to the selected body portion of the automobile. Bicycle carrier means project outwardly from one of the brace members for supporting one or more bicycles thereon.

Accordingly, an object of the present invention is to provide a bicycle support rack for attachment to the rear or trunk lid body portion of an automobile irrespective of the configuration of the automobile supporting surface.

Another object and feature of the present invention is to provide a bicycle support rack for attachment to a selected body portion of an automobile in a manner that will not substantially interfere with the driver's rear vision or block access to the trunk.

A further object, feature and advantage of the present invention is to provide a bicycle support rack that can be quickly and easily installed on and removed from selective body portions of an automobile, and wherein the individual components are economical to manufacture and easy to assemble.

The above brief description, as well as further objects, features and advantages of the present invention, will be more fully appreciated by reference to the following detailed description thereof, when taken in conjunction with the accompanying drawings.

BRIEF DESCRIPTION OF THE DRAWINGS

FIG. 1 is an exploded view in perspective illustrating the component parts of the bicycle support rack constructed in accordance with the present invention;

FIG. 2 is a perspective view of the assembled support rack illustrating it in mounting relation to a selected rear surface portion of an automobile, the vehicle and bicycle being shown in phantom;

FIG. 3 is a view similar to FIG. 2 illustrating the rack in its mounting relation to a selected rear surface portion of another automobile of different configuration;

FIG. 4 is a perspective view of the assembled bicycle support rack; and

FIG. 5 is a perspective view of the support rack with the component parts positioned for flat packaging on storage.

DESCRIPTION OF THE PREFERRED EMBODIMENT

Referring to the drawings, and more particularly to FIGS. 1 and 4, numeral 10 represents a novel bicycle support rack constructed in accordance with the present invention. Support rack 10 includes a pair of U-shaped side members 20 and 30 preferably tubular in construction and formed of steel, aluminum or alloys thereof. It is to be understood, however, that aside from the U-shape of said side members, all other references herein to shapes and construction materials are purely illustrative and are not to be interpreted as being limitations on the present invention.

Tubular side members 20 and 30 are identical to one another in overall dimension and in cross sectional configuration. Thus, U-shaped member 20 is formed having a pair of leg portions 22 and 24 of unequal length interconnected by intermediate portion 26. The free ends of leg portions 22 and 24 are adapted to abut selected spaced body portions of an automobile, and are thus covered with plastic or rubber caps 28 to protect the surface finish of the automobile. Similarly, U-shaped member 30 is formed having a pair of leg portions 32 and 34 of unequal length interconnected by intermediate portion 36. The terminal ends of leg portions 32 and 34 are covered with rubber caps 38 similar to that provided for in connection with caps 28. Side members 20 and 30 are adapted to be disposed in laterally spaced relation to one another with the respective portions 22 and 32 representing one set of laterally spaced leg portions, and the respective portions 24 and 34 representing another set of laterally spaced leg portions. The unequal length of the sets of spaced leg portions is an important feature which enables the support rack to be mounted on a wide range of selected body portions of the automobile, irrespective of the configuration of the supporting surface thereof, as will become more apparent from a further description of the invention.

Support rack 10 further includes a pair of channel shape brace members 40 and 60, preferably formed of steel or alloys thereof, extending transversely of side members 20 and 30 and adapted to be slidably engaged therewith. Brace members 40 and 60 are substantially identical to one another with the exception of the number of through-openings therein as will be noted hereinafter. Brace member 40 is formed having flange portions 42 and 44 interconnected by web portion 46. Located at the opposite end portions of flange portions 42 and 44 are open end slots 48 and 50, respectively, which have an arcuate shape complementary to that of tubular side members 20 and 30. It will be appreciated, however, that the dimension and configuration of slots 48 and 50 are limited only to the extent that they complement the crosssectional dimension and configuration of the leg or intermediate portions of side members 20 and 30 such as to receive either said leg or intermediate portions and permit brace member 40 to slide thereon. In this regard, the opposed slots 48 and 50 are in alignment to locate brace member 40 in transverse relation to side members 20 and 30 to maintain said side members in laterally spaced relation in the assembled condition of the rack.

Similarly, channel brace member 60 is formed having flange portions 62 and 64 interconnected by web portion 66. Located at the opposite end portions of flange portions 62 and 64 are open end slots 68 and 70, respectively similar to that provided in connection with slots 48 and 50. Opposed slots 68 and 70 are in alignment to locate brace member 60 in transverse relation to side members 20 and 30 to also maintain said side members in laterally spaced relation in the assembled condition of the rack.

The assembly procedure thus provides for one of the brace members, for example brace member 40, to be mounted on the intermediate portions 26 and 36 of spaced side members 20 and 30, respectively, whereby said intermediate portions are received within the respective opposed slots 48 and 50 to enable brace member 40 to be slidably moved to selected positions on said side members. Fastening means are provided to secure brace member 40 to the said selected position which include a plurality of U-shaped bolts 80 each having threaded leg portions 82 and interconnecting bight portion 84. The threaded leg portions 82 are disposed to pass through selected spaced openings 52 located in the web portion 46 of brace member 40, with the associated bight portion 84 engaging the respective side members 20 and 30. Nut members 86 are then threaded onto the projecting end of bolt leg portions 82 to secure brace member 40 in its selected position. In actual use, after brace member 40 is mounted on intermediate portions 26 and 36, the bolts 80 and nuts 86 are loosely engaged and the brace member 40 is slidably moved to the selected position. The nuts and bolts are thus in proper position to be easily tightened after both brace members have been mounted and moved to their respective selected positions on the side members.

The other brace member 60 is then mounted on one set of the laterally spaced leg portions of said side members 20 and 30, for example the longer dimensioned leg portions 24 and 34, whereby said leg portions are received within the respective opposed slots 68 and 70 to enable brace member 60 to be slidably moved to selected positions on said side members. For example, after brace member 60 is mounted on leg portions 24 and 34, the threaded leg portions 82 of additional U-shaped bolts 80 are disposed to pass through selected spaced openings 72 located in the web portion 66 of brace member 60, and nuts 86 loosely engaged thereon, whereby the associated bight portion 84 of bolts 80 engage the respective side members 20 and 30. Brace member 60 is then slidably moved to the selected position on said leg portions and easily tightened.

It has been found essential that the greatest amount of stability to the rack 10 is achieved by mounting one brace member on the intermediate portions 26 and 36 of the spaced side members while the other brace member is mounted on one set of laterally spaced leg portions (i.e. portions 24 and 34) of said side members. It will be appreciated, however, that the aforesaid mounting arrangement of the brace members 40 and 60 is purely illustrative and can be altered, as will become later apparent in connection with the description of FIGS. 2 and 3, whereby brace member 60 is mounted on the intermediate portions 26 and 36 of the side members 20 and 30 and brace member 40 is mounted on the set of laterally spaced leg portions 24 and 34 of said side members.

Additional strength and stability to rack 10 is provided by increasing the number of fastening U-shaped bolts 80 on brace member 60 which is intended to carry and support the weight of the bicycle. In this connection, a bicycle or other article carrier means 90 is disposed to project outwardly from brace member 60 to support one or more bicycles thereon. More specifically, carrier means 90 comprises a pair of laterally spaced elongated rods, preferably formed of steel or alloys thereof, each having displaced or off-set portions 92 adapted to receive and support selected portions of a bicycle, and threaded portions 94 disposed to pass through spaced openings 76 located in the web portion 66 of brace member 60. Nut members 96 are threaded onto the projecting ends of said carrier rod portions 94 to secure the carrier means 90 firmly in place. Spaced openings 76 are located on the longitudinal axis of brace member 60 and are disposed such that the laterally spaced carrier rods 90 project outwardly normal to the surface of web portion 66, and are parallel to each other. If necessary, additional locking nuts (not shown) may be provided in association with threaded rod portions 94 and positioned to abut the outer surface of web portion 66 to reduce the likelihood of carrier rod 90 becoming loosened when the rack 10 is in use. Furthermore, it is understood that locking washers may be employed, as required, in assembling the rack.

For the purpose of mounting the support rack 10 to the selected body portion of the vehicle, there is provided a pair of laterally spaced slots 54 in flange portion 44 of brace member 40, and a corresponding pair of laterally spaced slots 74 in flange portion 62 of brace member 60. Slots 54 and 74 are each disposed to receive strap members 100 having hook end portions 102 for attachment to any available edge on the vehicle; such as the trunk lid or the like.

Referring now to FIGS. 2 and 3, the assembled rack 10 is illustrated in its mounting relation to selected rear surface portions of automobiles having different configurations. for example, the automobile 110 in FIG. 2 is intended to represent a typical station wagon model having a substantially vertical rear surface 112 constituting the rear door or tail gate portion of the vehicle. The side members, 20 and 30 having the associated brace members 40 and 60 loosely connected thereto are positioned on rear surface 112 with the capped free ends of leg portions 22, 24, 32 and 34 in abutting contact thereto. The objective is to selectively orientate the rack on the rear surface 112, and selectively position the brace members 40 and 60, such that all the leg portions are in firm contacting relation to the support surface 112, and the carrier rods 90 projecting substantially parallel to the road surface upon which the vehicle travels. Accordingly, for the illustration in FIG. 2, it was found that the mounting arrangement is quickly and conveniently performed by locating the longer set of spaced leg portions 24 and 34 adjacent the roof line of the vehicle, with brace member 40 slidably moved to be mounted on said leg portions and extend transversely thereof. The fastening bolts 80 for brace member 40 may now be tightened and strap members 100 suitably adjusted to bring hook end portions 102 into gripping contact relation with either the roof line edge or upper door lid 114, as the case may be. Brace member 60 is then selectively moved to a convenient position on the laterally spaced intermediate portions 26 and 36 of side members 20 and 30, and its corresponding fastening bolts 80 tightened, whereupon the associated strap members 100 are adjusted to bring hook end portions 102 into gripping contact relation with the lower door lid 116. It will be appreciated that the aforesaid mounting arrangement serves to locate the carrier rods 90 in a convenient position for supporting one or more bicycles "B" thereon. In this connection, additional straps (not shown) are employed to tie the supported bicycles to the carrier rods 90 or other parts of the supporting rack 10, if necessary, to insure that the bicycles do not become disengaged from the carrier rods while in transit.

For the illustration in FIG. 3, it was found most convenient to mount the support rack 10 to the sedan body style of automobile 120 by locating the longer set of spaced leg portions 24 and 34 adjacent the lower trunk lids of rear surface 122. Brace member 40 was then slidably moved to be mounted on the laterally spaced intermediate portions 26 and 36 of side members 20 and 30, and brace member 60 was selectively mounted on the longer set of spaced leg portions 24 and 34. The fastening bolts 80 and strap members 100 were suitably tightened to bring hook end portions 102 into gripping contact relation with the upper and lower trunk lid edges 124 and 126, respectively.

FIG. 5 illustrates how the side members 20 and 30 can be rotated toward each other for convenience in packaging in arriving at a relatively flat shipping container, or for storage. In this regard, after the support rack is removed from the vehicle, the fastening bolts 80 are loosened to permit brace members 40, 60 to be slideably positioned on the intermediate portions 26, 36 of spaced side members 20 and 30, respectively. The side members 20, 30 may now be rotated whereby the pairs of leg portions 22, 32 and 24, 34 respectively project toward one another to form a relatively flat structure for purposes of packaging or storage.

It will now be apparent from the above description that the present invention provides for an improved bicycle support rack that eliminates the difficulties and other shortcomings heretofore referred to in the description of the prior art. The support rack can be constructed and assembled rather quickly with a minimum of effort. The mounting arrangement is not dependent on using the bumpers of the vehicle for attachment purposes. The supported bicycles do not interfere with the vision of the driver and do not block access to the trunk or interior of the vehicle. While the support rack has been illustrated in its mounting relation to two separate surface configuration, it will be appreciated that the device can be easily mounted to a wide range of body style surfaces irrespective of the configuration thereof. This is essentially due to the uneven lengths of the sets of spaced leg portions 22, 32 and 24, 34 which enable the side members 20 and 30 to accommodate curved or irregular shaped supporting surfaces, while still providing multi-axis support for the rack and achieving a high degree of stability for the mounted structure.

While a specific embodiment of the invention has been shown and described in detail, it will be further understood and appreciated that various changes or modifications thereof may be made without departing from the spirit and scope of the invention as set forth in the appended claims.

I claim:

1. An article support rack for attachment to selected body portions of a vehicle; said rack comprising:
 a. a pair of laterally spaced U-shaped side members;
 b. each of said side members including a pair of leg portions of unequal length adapted to abut selected spaced body portions of the vehicle, and an intermediate portion interconnecting said leg portion;

c. a pair of brace members extending transversely of the side members; each of said brace members being of channel shape cross section having flange portions and an intermediate web portion;

d. the flange portions of said brace members having aligned open end slots at the opposite end portions thereof for receiving the side members and permitting the brace members to be slidably moved to selected positions on the side members;

e. one of the brace members being mounted on the intermediate portions of the laterally spaced side members and the other one of said brace members being mounted on one set of the laterally spaced leg portions of said side members;

f. means for securing the brace members to the selected positions on the side members;

g. article carrier means projecting outwardly from one of the brace members; and h. additional means for securing the support rack to selected body portions of the vehicle;

i. whereby said side members are supported in spaced apart relation solely by said brace members, and whereby said brace members may be adjustably moved to selected positions on said side members to permit collapsing of the support rack for storage.

2. The article support rack as recited in claim 1, wherein the means for securing the brace members to the side members comprises U-shape bolts having threaded leg portions and an interconnecting bight portion; the brace members having spaced openings in the respective web portions thereof; said bolts being positioned relative to the side members to pass the leg portions thereof through selected spaced openings in the web portions of the brace members with the bight portions thereof engaging said side members; and nut members threaded on the projecting ends of the leg portions of the bolts.

3. The article support rack as recited in claim 1, wherein the means for securing the rack to the vehicle comprises strap members; the brace members having slots in selected flange portions thereof for receiving said strap members.

* * * * *